June 23, 1964   M. S. DE LAY ETAL   3,138,271
BOAT TRAILERS
Filed July 28, 1961   5 Sheets-Sheet 2

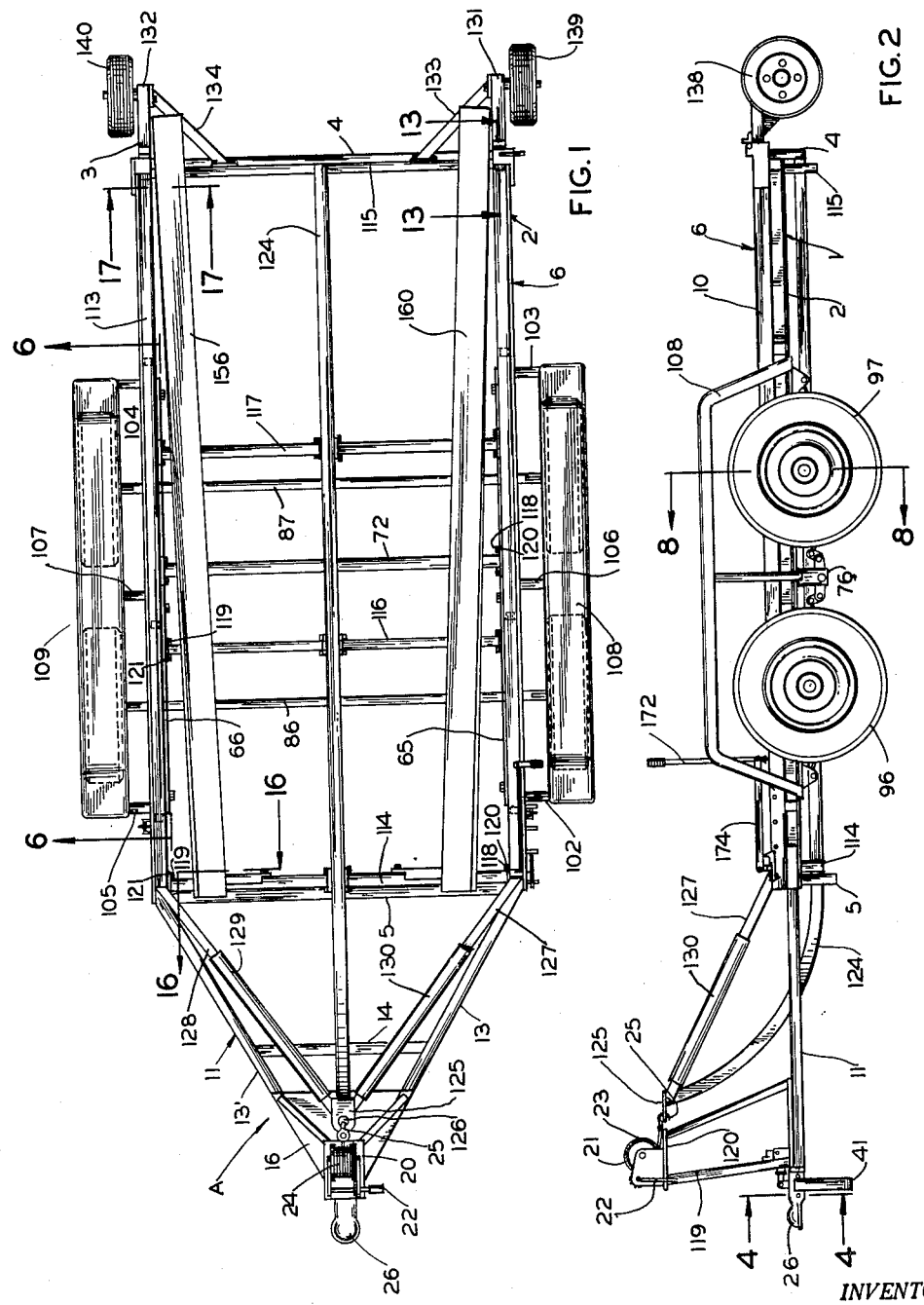

*INVENTORS.*
MANFORD S. DE LAY
ALLEN C. DICKEY, SR.
BY
ATTORNEY

June 23, 1964  M. S. DE LAY ETAL  3,138,271
BOAT TRAILERS
Filed July 28, 1961  5 Sheets-Sheet 3
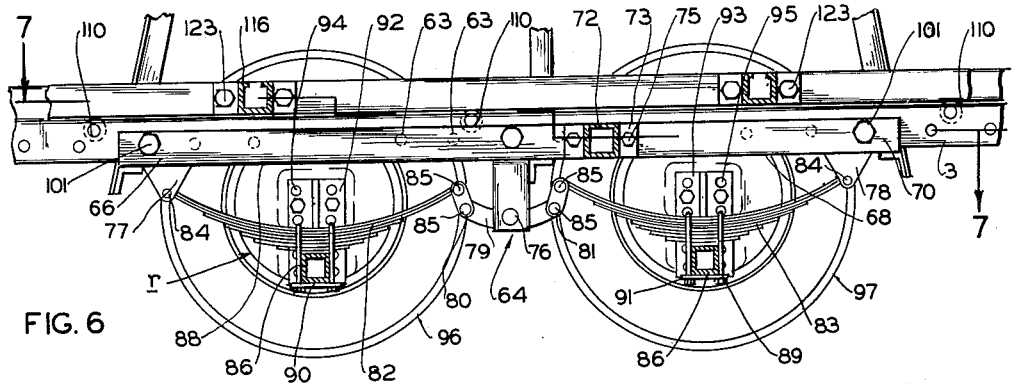
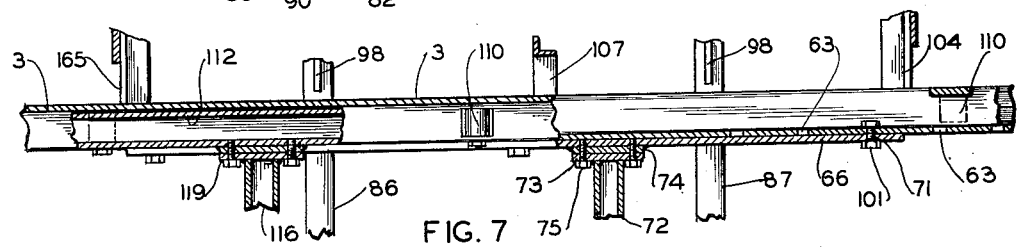
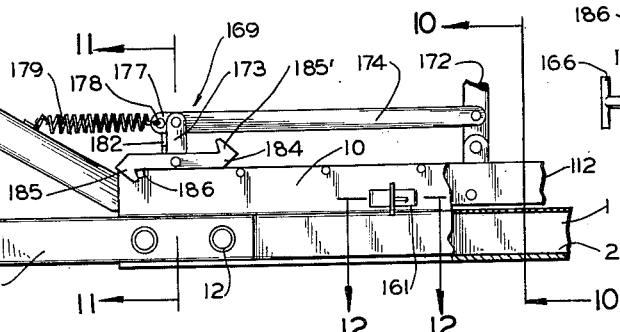
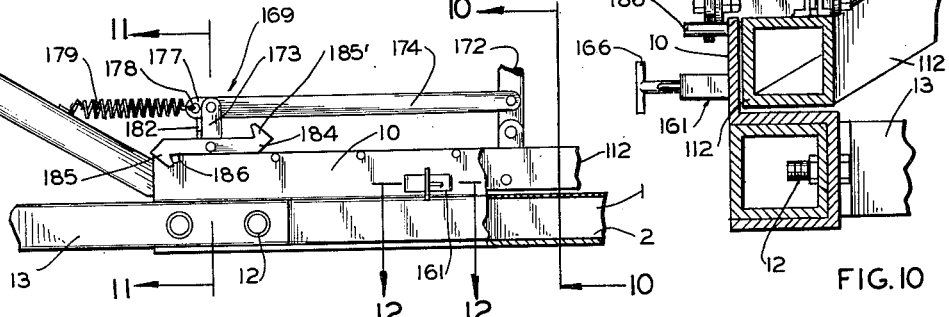
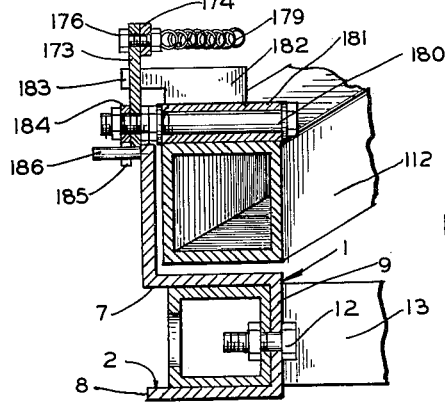
INVENTORS.
MANFORD S. DE LAY
ALLEN C. DICKEY, SR.
BY
ATTORNEY

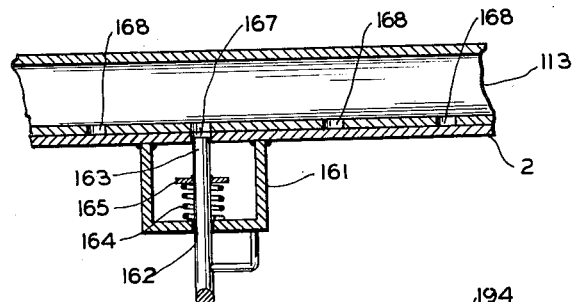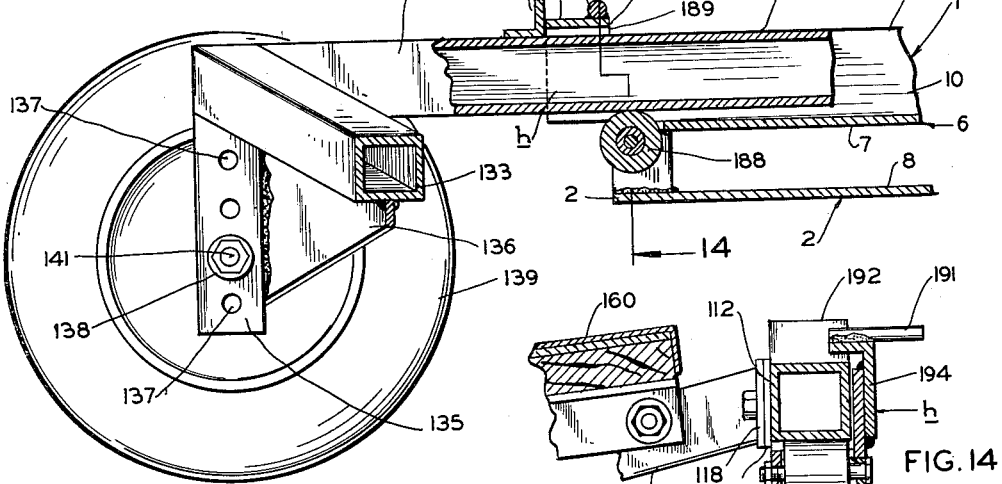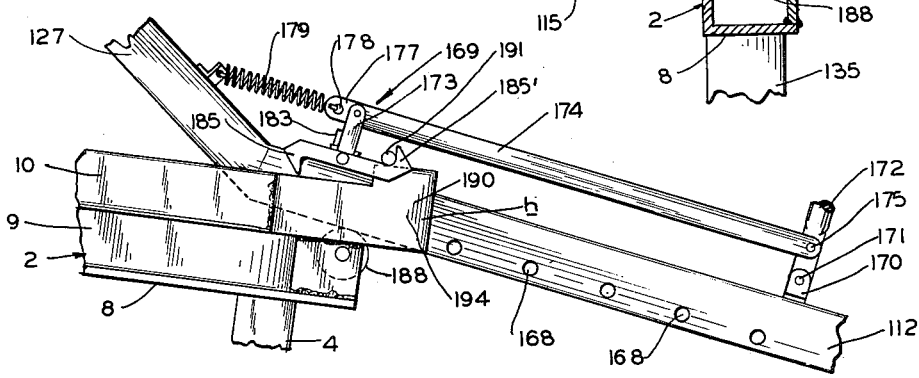

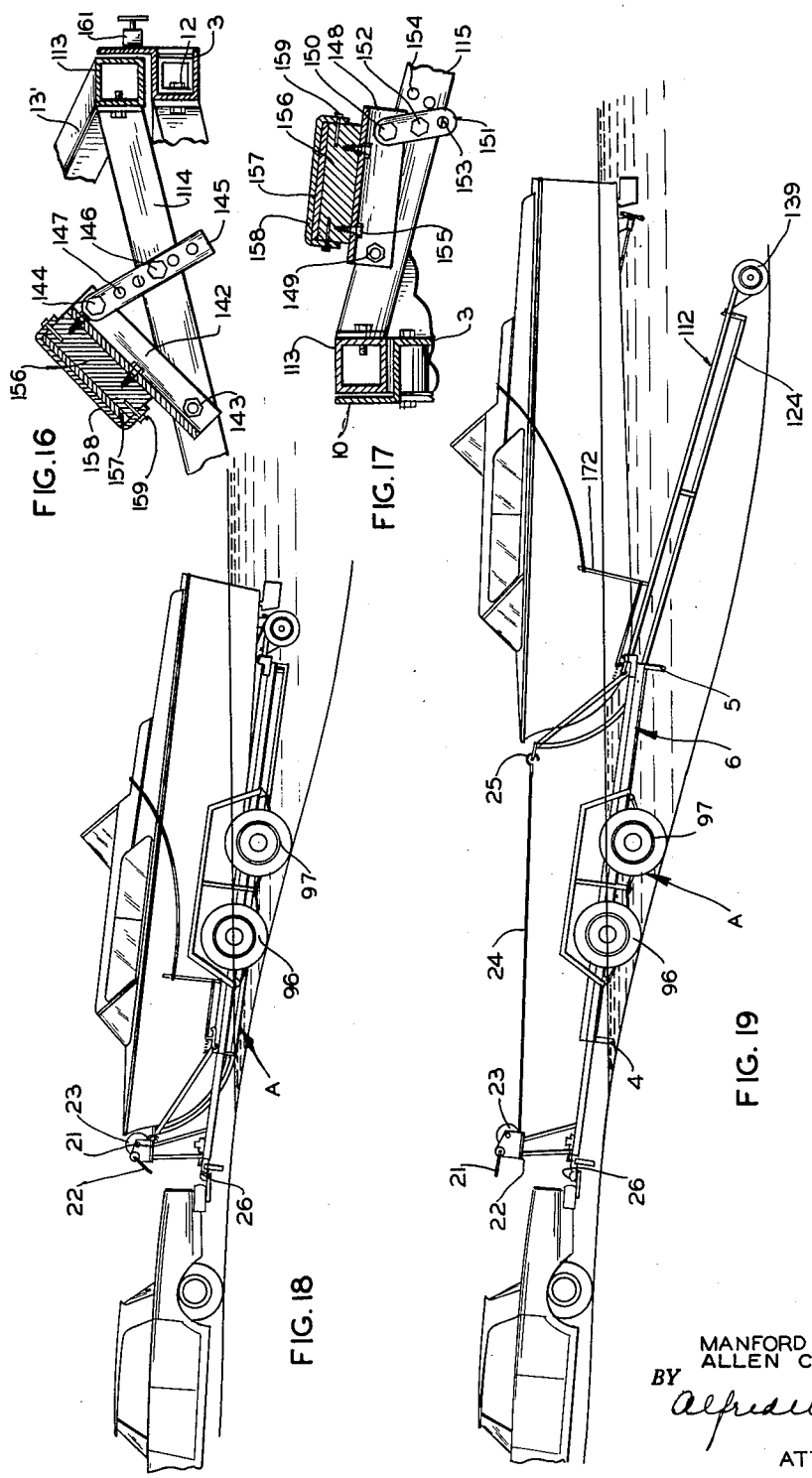

United States Patent Office

3,138,271
Patented June 23, 1964

3,138,271
BOAT TRAILERS
Manford S. De Lay, 2117 Gravois Ave., St. Louis County, Mo., and Allen C. Dickey, Sr., 11074 Breezy Point Lane, Florissant 36, Mo.
Filed July 28, 1961, Ser. No. 127,638
9 Claims. (Cl. 214—85)

This invention relates in general to certain new and useful improvements in boat trailers and, more particularly, to trailers with improved means for loading and unloading boats.

Today, many boating enthusiasts transport their boats by means of a trailer attached to an automobile or other towing vehicle. However, boats approaching the size of seventeen feet and longer, usually possess considerable weight and present serious difficulties to one desiring to launch such vessel into the water. Because of this difficulty, the boat owner very often will have to launch his boat at a commercial loading dock. Moreover, some boating enthusiasts rent space at a boat house so as not to encounter the difficulties of loading and unloading their boats.

It is, therefore, the primary object of the present invention to provide a boat trailer having an improved means for launching the boat and thereafter removing the boat directly from the water.

It is another object of the present invention to provide a boat trailer of the type stated having adjustable tandem means so that the trailer can be readily adapted for carrying boats of different weights and lengths.

It is an additional object of the present invention to provide a boat trailer of the type stated that is provided with improved locking and braking means.

It is a further object of the present invention to provide a boat trailer of the type stated that is sturdy in construction and economical in cost.

It is still another object of the present invention to provide a boat trailer of the type stated that is compact in construction, light in weight, and capable of supporting boats of various sizes and weights.

It is also an object of the present invention to provide a boat trailer of the type stated which is capable of being transported in a small compact unit and easily assembled at its destination.

With the above and other objects in view, our invention resides in the novel features of form, construction, arrangement, and combination of parts presently described and pointed out in the claims.

In the accompanying drawings (five sheets):

FIG. 1 is a top plan view of a boat trailer constructed in accordance with and embodying the present invention;

FIG. 2 is a side elevational view of a boat trailer constructed in accordance with and embodying the present invention;

FIG. 6 is a fragmentary sectional view taken along line 6—6 of FIG. 1;

FIG. 7 is a fragmentary sectional view taken along line 7—7 of FIG. 6;

FIG. 9 is a side elevational view of a locking means forming part of the present invention partly broken away and in section;

Figures 3, 4:
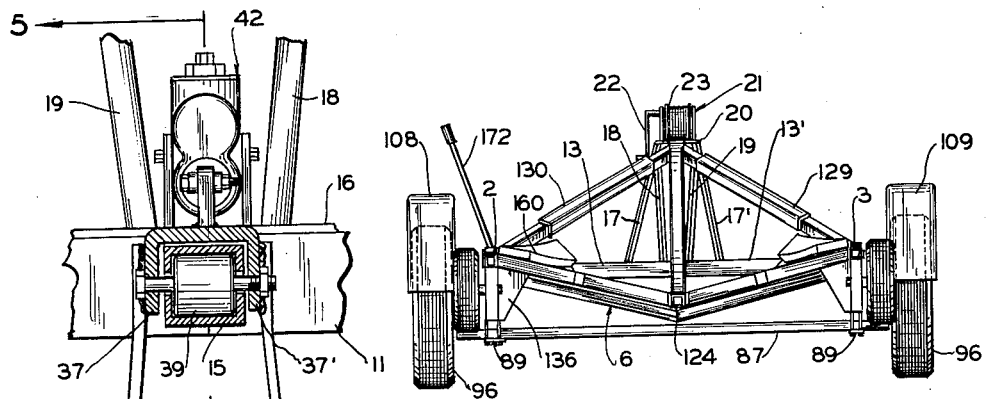
FIG. 3 is a rear elevational view of a boat trailer constructed in accordance with and embodying the present invention.
FIG. 4 is a fragmentary sectional view taken along line 4—4 of FIG. 2.

FIGS. 10, 11, and 12 are fragmentary sectional views taken along lines 10—10, 11—11, and 12—12, respectively, of FIG. 9;

FIG. 13 is a fragmentary sectional view taken along line 13—13 of FIG. 1;

FIG. 14 is a fragmentary sectional view taken along line 14—14 of FIG. 13;

FIG. 15 is a side elevational view of the cradle locking means forming part of the present invention and with the cradle in extended position;

FIGS. 16 and 17 are fragmentary sectional views taken along lines 16—16, 17—17, respectively, of FIG. 1;

FIG. 18 is a side elevational view of the boat trailer shown connected to a motor vehicle and supporting a boat; and FIG. 19 is a side elevational view similar to FIG. 18 showing the boat trailer with the cradle in an extended position.

Referring now in more detail and by reference characters to the drawings, which illustrate a preferred embodiment of the present invention, A designates a boat trailer having a base 1 consisting of two lengthwise extending support members 2, 3, connected at each of their lateral ends by laterally extending support members 4, 5, forming a rectangular chassis 6. Referring now to FIG. 11, it will be seen that the lengthwise extending support members 2, 3, are formed in a somewhat U-shaped channel construction having lower and upper horizontal web members 7, 8, respectively, which are connected at one lateral margin by a vertically extending web member 9. Integrally formed on the opposite lateral margin of the upper horizontal web member 7 is an upwardly extending flange member 10, all for reasons which will presently more fully appear. The laterally extending support members 4, 5, are bent to have a lower downwardly inflected center-portion giving the length of the members 4, 5, somewhat of a U-shaped configuration.

Referring now to FIGS. 1 and 2, it will be seen that a forwardly extending A-frame 11 is rigidly connected to the forward margins of the support members 2, 3, by means of bolts 12. The A-frame 11 comprises two forwardly extending inwardly converging support members 13, 13', that are formed of a heavy-gauge square-shaped channel steel. Cross-connecting the two A-frame members 13, 13', somewhat centrally thereof, is a transversely extending strut member 14. Welded to the A-frame members 13, 13', at the apex of the A-frame 11 is a forwardly extending support member 15 preferably formed of square tubing. A horizontal triangular plate 16 is bolted or otherwise rigidly secured at the forward apex of the A-frame 11 for supporting four upwardly extending support members 17, 17', 18, 19, which, in turn, support a horizontal rectangularly shaped plate 20. Rigidly mounted to the plate 20 is a conventional type cable winch 21 having a bell-crank arm 22 and a pulley 23. A cable 24 is trained around the pulley 23 and is provided with a hook 25 at one end.

Figure 5:
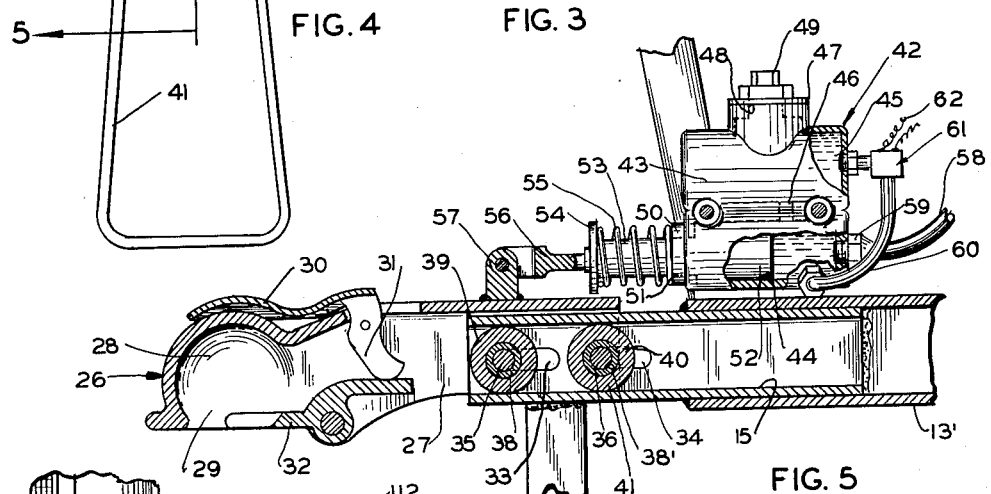
FIG. 5 is a fragmentary sectional view taken along line 5—5 of FIG. 4, partly broken away and in section.

Referring now to FIGS. 4 and 5, it will be seen that a conventional type of trailer hitch 26 having a forwardly extending drawbar 27 constructed of U-shaped channel steel is shiftably mounted on the forwardly extending support member 15. The trailer hitch 26 is provided with a somewhat spherical socket 28 having a downwardly presented opening 29 for receiving a ball-shaped member (not shown) of the part of the trailer hitch conventionally attached to the towing vehicle. The trailer hitch 26 provided with a pivotally mounted lock release and locking handle 30 which is provided with a downwardly extending flange member 31 that engages a pivotally mounted locking arm 32. Thus, when the locking handle 30 is raised, the downwardly extending flange member 31 will be raised from abutting position with the locking arm 32 thereupon permitting the locking arm 32 to drop. After the ball member of the trailer hitch has been received within the central aperture 29 the locking handle 30 is closed permitting the locking arm 32 to raise. The forwardly extending support member 15 is provided with two elongated slots 33, 34, on each of its vertical sides for accommodating two horizontally extending shafts 35, 36, which are rigidly mounted within two downwardly extending flange members 37, 37', which form part of the U-shaped drawbar 27. Rotatably mounted on each of the horizontally extending shafts 35, 36, by means of bearings 38, 38', are two transversely extending roller wheels 39, 40, respectively. The roller wheels 39, 40, moreover, are sized for rotatable but snug-fitting engagement with the inner surfaces of the upper and lower web members of the square-shaped channel support member 15. By means of this construction, it can be seen that the drawbar 27 of the trailer hitch 26 is shiftably mounted on the forwardly extending support member 15 within the limits of the elongated slots 33, 34. Thus, when a braking force is applied to the towing vehicle, the trailer hitch 26 will be urged rearwardly and the drawbar 27 containing the two transversely extending shafts 35, 36, will also move rearwardly by means of the roller wheels 39, 40 until the shafts 35, 36, abut the rearward edge of the elongated slots 33, 34. A somewhat U-shaped downwardly extending trailer support 41 is welded or otherwise rigidly secured to the downwardly extending flange members 37, 37', of the U-shaped drawbar 27.

A hydraulic actuating cylinder 42 is rigidly mounted on the upper end of the forwardly extending support member 13. The actuating cylinder 42 comprises a housing 43 having a master cylinder 44 and a brake fluid reservoir 45 mounted above the cylinder 44 and forms part of the housing 43. Communication is provided therebetween by means of a central bore 46. The brake fluid reservoir 45 is provided with an upwardly extending circular boss 47 having an inlet port 48 for receiving hydraulic brake fluid. The inlet port 48 is sealed by means of a bolt 49. A circular boss 50 having a central aperture 51 is formed on the forward margin on the cylinder 44. A piston 52 is slidably mounted within the cylinder 44 and is provided with a diametrally reduced outwardly extending shaft 53 that is sized for slidable disposition within the aperture 51 of the boss 50. An abutment plate 54 is rigidly secured to the forward margin of the outwardly extending shaft 53 and a compression spring 55 is mounted on the shaft 53 that biases against the boss 50 and abutment plate 54 for urging the piston 52 in a forwardly direction. The compression spring 55 should preferably, though not necessarily, contain a resisting compressional force of approximately one-hundred pounds. A forwardly extending arm member 56 is rigidly secured at its rearward end to the abutment plate 54. At its forward end the arm 56 member is similarly secured to an upwardly extending flange 57 which is, in turn, rigidly mounted on the drawbar 27. A flexible hose 58 is connected by means of a fitting 59 to the brake cylinder 44 and to a conventional type of hydraulic brake r on the boat trailer A. Thus, when the brakes are applied in the towing vehicle, such as an automobile, a stopping action will be caused in the trailer hitch 26, and the momentum of the trailer A will urge the member 15 slidably forward within the U-shaped drawbar 27. When this action has a force exceeding the resisting force of the compression spring 55, the forwardly extending arm member 56 will urge the piston 52 rearwardly within the hydraulic cylinder 44, thus causing fluid to be applied to the brakes r within the boat trailer A. A piece of flexible tubing 60 hydraulically connects the fluid reservoir 45 to the hydraulic cylinder 44 and interposed therebetween within the flexible tubing 60 is an electrically operated solenoid valve 61 having electrical conduits 62 which are, in turn, connected to the back-up light system of the towing vehicle. Thus, if it is desired to drive the towing vehicle in the reverse direction, the electrically operated signal from the back-up lights will actuate the solenoid valve 61 opening the same and permitting fluid to flow from the hydraulic cylinder 44 into the reservoir 45, thereby preventing the application of fluid to the brakes r of the boat trailer A when the towing vehicle is moved rearwardly.

Figure 8:
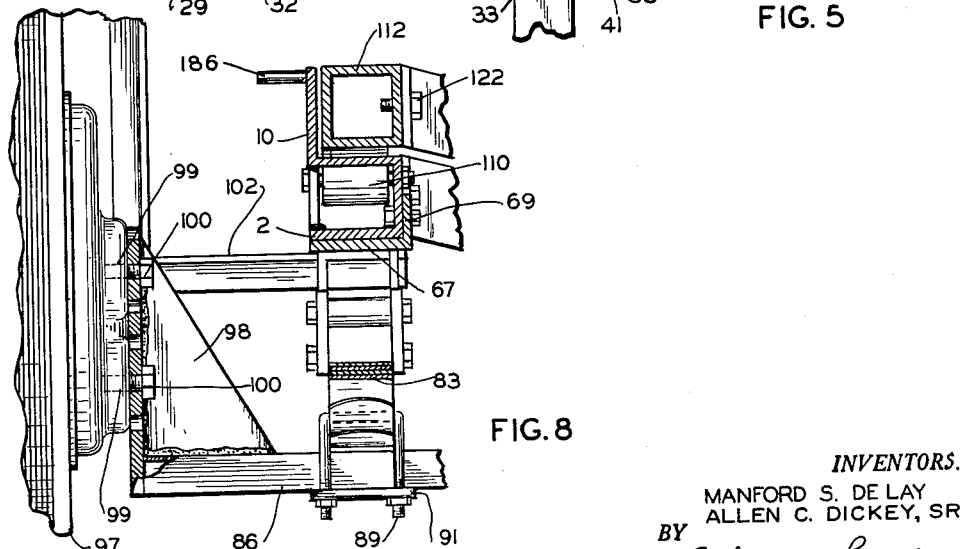
FIG. 8 is a fragmentary sectional view taken along line 8—8 of FIG. 2.

Referring now to FIGS. 6, 7, and 8, it will be seen that each of the outwardly presented vertically extending web members 9 of the lengthwise extending support members 2, 3, are provided with a plurality of apertures 63 for adjustably mounting a tandem 64. The tandem 64 comprises two lengthwise extending L-shaped brackets 65, 66, each of which is respectively provided with horizontal plates 67, 68, and vertical upwardly extending plates 69, 70, respectively. Each of the plates 69, 70, is provided with a series of apertures 71 that are sized and spaced for matching overlying engagement with the apertures 63 lengthwise extending support members 2, 3. Each of the brackets 65, 66, moreover, is rigidly connected together in their central portions by means of a transversely extending cross-bar 72 having a square cross-sectional shape. The cross-bar 72 is also formed with a downwardly inflected center portion similar to the support members 4, 5, defining a U-shaped transverse lengthwise configuration. Plate members 73 are welded to each transverse end of the cross-bar 72 and are sized and matched for overlying engagement with plate members 74 rigidly welded to the L-shaped brackets 65, 66, at the point of connection, whereupon the cross-bar 72 is rigidly attached to the L-shaped brackets 65, 66, by means of bolts 75. Thus, the plate members 73, 74, provide a greater depth of threaded attachment for the bolts 75, thereby enabling the cross-bar 72 to withstand a greater shearing force at the point of connection. Downwardly extending U-shaped link-supporting elements 76 are bolted or otherwise rigidly secured to the underside of the horizontal plates 67, 68, of the L-shaped brackets 65, 66, somewhat centrally thereof. Similarly, the L-shaped brackets 65, 66, are provided adjacent their transverse ends with two downwardly extending U-shaped hanger elements 77, 78. Horizontally extending link members 79 are pivotally mounted on the lower end of the downwardly extending link-supporting elements 76 and extend beyond their vertical transverse margins and are provided with two upwardly extending link members 80, 81, whereupon, leaf-springs 82, 83, can be pivotally attached to the lower end of the U-shaped hanger elements 77, 78, by means of pins 84, and can be pivotally attached to the upper end of the upwardly extending link members 80, 81, by means of pins 85. Transversely extending square-shaped axles 86, 87, are mounted on the underside of the lower leaf of each of the leaf-springs 82, 83, by means of U-shaped bolts 88, 89, having horizontally extending support plates 90, 91, respectively. Upwardly extending plates 92, 93, each being provided with a plurality of apertures 94, 95, are welded to each of the transverse ends of each of the square-shaped axles 86, 87, for supporting conventional types of motor vehicle wheels 96, 97. Each of the vertically extending plates 92, 93, are reinforced by means of triangular gussets 98 which are welded to the axle members 86, 87, and the vertically extending plates 92, 93. The wheels 96, 97, are, moreover, provided with a series of apertures 99, that are sized and spaced for overlying engagement with the apertures 94, 95, for accommodating bolts 100, whereupon, the wheels 96, 97, can be rigidly attached to the plates 92, 93, at various selected positions of height-adjustment. Thus, if it is desired to have the boat trailer A very near the ground, the wheels 96, 97, can be rigidly fastened to the plates 92, 93, at the highest set of apertures 94, 95. Conversely, if it is desired to have the trailer A raised to its highest possible position from the ground or pavement, the wheels 96, 97, can be fastened to the plates 92, 93, at the lowest set of apertures 94, 95.

The tandem 64 is attached to the lengthwise extending support members 2, 3, of the chassis 6 at any convenient position by means of bolts 101, since each of the brackets 65, 66, and the lengthwise extending support members 2, 3, are provided with a plurality of apertures 71, 63, respectively, that are sized and spaced for overlying engagement. For boats of greater weight, the tandem 64 would be moved to the rear of the chassis 6 and, similarly, the tandem 64 would be moved forwardly on the chassis 6 for boats of lesser weight. Each of the brackets 65, 66, are, moreover, provided on their lower surfaces at each of their transverse ends with downwardly extending L-shaped brackets 102, 103, 104, 105, respectively, and centrally thereof with L-shaped brackets 106, 107, respectively, for supporting fenders 108, 109.

It is obvious that the vertical position of the wheels 96, 97, on the tandem 64 can be varied and the tandem 64 can be varied at its distance along the length of the chassis 6 for supporting boats and other nautical craft of various lengths, weights, and sizes. The tandem 64, moreover, by reason of the springs 82, 83, is capable of absorbing shocks resulting from ruts and other minor obstructions in the road. If one of the wheels 96 was urged upward by some obstruction in the road or pavement, the respective leaf spring 82 would be urged therewith and would thereby cause the link members 79 to pivot about the supporting element 76 and raise the link member 80. This, in turn, causes the link member 81 to be lowered and thereby lowering the leaf spring 83 and wheel 97 to equalize the load or weight supported thereon. When the wheel 96 has passed over the obstruction, the wheel 97 will be raised by the same, thereby causing the wheel 97 and respective leaf spring 83 attached thereto to be urged upwardly. This upward action will cause the link 76 to rock about the pin 79, lowering the link 80 and leaf spring 82. This will, in turn, cause the wheel 96 to be urged downwardly for receiving a greater part of the load.

Referring now to FIGS. 1 and 8, it will be seen that rollers 110 are mounted within each of the lengthwise extending support members 2, 3, and project upwardly through apertures o formed in the horizontal web 9 of the support members 2, 3, for supportive engagement of a boat cradle 111 having lengthwise extending support members 112, 113, which are slidably mounted on the rollers 110. Each of the lengthwise extending support members 112, 113, are cross-connected at their opposite ends by cross-bars or supports 114, 115, which are V-shaped and converge downwardly to a low center point as in the case of the transverse support members 4, 5. Similarly, the lengthwise extending support members 112, 113, are cross-connected intermediate their ends by means of two transversely extending square-shaped cross-bars or support members 116, 117. The support members 116, 117, are formed with a V-shaped configuration forming a downwardly inflected center portion, similar to the support members 4, 5. Each of the cross-bars 114, 115, 116, 117, are, moreover, provided with vertical plates 118, 119, welded at each of their transverse margins that are sized and adapted for overlying engagement with vertical plates 120, 121, which are welded to the lengthwise extending support members 112, 113, whereupon, the transverse support members 116, 117, can be bolted to the lengthwise extending members 112, 113, by means of bolts 122, 123. A lengthwise extending central support 124 is welded to the upper marginal surfaces of each of the transverse support members 114, 115, 116, 117. The central support 124 extends forwardly of the cross-bars support 114 and is curved upwardly with respect thereto in a shape somewhat similar to the bow of a boat. The central support 124 terminates in a flange member 125 which is provided with a central aperture 126 for accommodating the hook 25 on the cable 24. The central support 124, moreover, is positioned in a plane slightly above the converging low portions of each of the transverse support members 3, 4, and 72. Two upwardly and inwardly converging support members 127, 128, are rigidly connected at one end to the underside of the flange member 125 and at their other end to the connections of the lengthwise extending support members 112, 113, with the cross-bar 114, respectively. Each of the upwardly extending support members 127, 128, is provided with padded surfaces 129, 130, to prevent any abrasions or scratching of a hull of a boat supported thereon. Rigidly attached to each of the lengthwise extending support members 112, 113, are two rearwardly extending wheel-support members 131, 132, having a somewhat square cross-sectional shape, and of similar size to the support members 112, 113. Each of the support members 131, 132, are suported by square-shaped struts or support members 133, 134, respectively, which are welded to the support members 131, 132, at one end, and to the transverse support 115 at their other ends. Downwardly extending flange members 135 are welded to each of the rearwardly extending support members 131, 132, adjacent each of the struts 133, 134, respectively. The flange members 135 are, moreover, reinforced by downwardly extending gussets 136, that are welded to the members 135 and the support members 133, 134, respectively. The flange member 135 is provided with a series of vertically spaced aligned apertures 137 which are sized and spaced for matching engagement with a series of vertically aligned apertures 138 of rear wheels 139, 140. Each of the series of apertures 137, 138, are sized for receiving bolts 141 in order to secure the wheels 139, 140, to the downwardly extending flange 135. The wheels 139, 140, of course, by this construction can be secured to the flanges 135 in any of a plurality of vertical positions thereby varying the height of the rearward end of the cradle 111 with respect to the ground.

Referring now to FIGS. 16, and 17, it will be seen that an upwardly extending link 142 is bolted to the forward transverse support member 114 by means of a bolt 143, and bolted to the upper end of the link 142 by means of a bolt 144 is a downwardly extending link member 145 which is, in turn, bolted to the transverse support member 114 by means of a bolt 146. The link 145 is, moreover, provided with a series of apertures 147, which are sized for receiving the bolt 146, thereby, providing means for increasing and decreasing the angle that the link 142 forms with the transverse member 114. A link member 148 is, similarly, bolted to the rearward transverse support member 115 adjacent the lengthwise extending support member 113 by means of bolts 149. Bolted to the upper end of the link member 148 by means of a bolt 150 is a downwardly extending link 151 which is bolted at its central portion by means of a bolt 152 to the transverse support member 115. The link 151 is, similarly, provided with a series of apertures 153 for securement to the support member 115 in a plurality of positions so that the angle that the link 148 forms with the support member 115 can be varied. The support member 115 is, similarly, provided with a series of apertures 154 adjacent the link 151 for providing lateral displacement of the link 151. Rigidly bolted by means of bolts 155 to the upper end of the links 142, 148, is a lengthwise extending wooden boat-supporting member or stringer 156 which is provided with an upper layer of padding 157 and a U-shaped cover padding 158 disposed over the padding 157. The padding 158 is secured to the stringer 156 by means of screws 159. Preferably, though not necessarily, the padding should be constructed of a heavy type of fibrous material which is capable of withstanding heavy abrasion. Similarly, a boat-supporting member or stringer 160 is fastened to each of the transverse support members 114, 115, by means of the links 142, 148, and lies adjacent the lengthwise extending support member 112. The stringers 156, 160, are curved upwardly and inwardly at their forward ends so as to conform to the general shape of a hull of a boat to be nested therein.

Welded to each of the lengthwise support members 2, 3, somewhat centrally thereof, is an outwardly extending U-shaped bracket 161 which is provided with an aperture 162 for slidably accommodating a pin 163 that is spring-biased inwardly by means of a spring 164 disposed therearound. The spring 164 abuts against a plate 165 welded to the pin 163 at one end and against the inner surface of the U-shaped brackets 161 at the other end. The pin 163, moreover, is provided with an upwardly extending handle 166. The upwardly extending flange member 10 of the lengthwise extending support members 2, 3, are also provided with apertures 167 for slidably accommodating the pin 163 and, similarly, the lengthwise extending support members 113, 114, are provided with a plurality of apertures 168 which are sized and adapted for overlying engagement with the apertures 167 also for slidably accommodating the pin 163, thereby locking the cradle 111 in any one of a plurality of positions all as best seen in FIG. 12.

Referring now to FIGS. 9 and 10, it will be seen that a cradle release and locking mechanism 169 is mounted on the upper surface of the cradle support member 112. The locking mechanism 169 consists of an upwardly extending flange 170 that is bolted or otherwise rigidly secured to the upper surface of the support member 112. Pivotally mounted on the upper end of the flange 170 by means of a pin 171 is an upwardly extending lever arm 172. A second upwardly extending flange 173 having a greater vertical height than the flange 170 is pivotally mounted on the support member 112 forwardly of and in spaced relation to the flange 170. A horizontal connecting bar 174 is pivotally mounted on the lever arm 172 by means of a pin 175 and also pivotally mounted on the upwardly extending flange 173 by means of a pin 176. The connecting bar 174 has a forwardly extending portion 177 that is provided with an eyelet 178 for accommodating a coil spring 179 which is, in turn, secured to the upwardly extending support member 127. The flange 173 is pivotally mounted on the support member 112 by means of a pin 180 that is journaled in a housing 181 which is welded to the upper surface of the support member 112. Rigidly secured to the housing 181 is an upwardly extending stop-member 182 with an outwardly extending abutting element 183 for preventing forward movement of the flange 173. Rigidly mounted on one end of the pin 180 is a link member 184 having a downwardly extending projection 185 and an upwardly extending projection 185'. The link member 184 is spaced outwardly of the support member 112 and of the web 10 of the lengthwise extending support member 2 for abutting engagement with a pin 186 that is rigidly mounted on and extends outwardly of the web 10. Thus, by means of this construction, when it is desired to release the link member 184 from abutting engagement with the pin 186, the position as shown in FIG. 9, the lever arm 172 is pulled rearwardly about the pin 171 urging the connecting bar 174 and flange 173 therewith. As the flange 173 is urged rearwardly, the link 184 will rock about the pin 180 and the downwardly extending projection 185 will be raised from abutting contact with the pin 186, thereby permitting the cradle 111 to roll rearwardly within the chassis 6. Forward movement of the support member 112 is prevented by the abutting contact of the downwardly extending projection 185 against the outwardly extending element 183.

Referring now to FIG. 13, it will be seen that rollers 188 are rotatably mounted at the rear lateral margin of the lengthwise extending support members 2, 3, and project upwardly therefrom, for supportive engagement of the support members 112, 113, permitting the cradle 111 to roll rearwardly within the chassis 6. Welded to and extending rearwardly from the lengthwise extending support members 2, 3, are rearwardly extending stop members 189 having upwardly extending head portions *h* which are in turn provided with forwardly presented surfaces 190, the head portions *h* are, moreover, provided with outwardly extending bars 191 rigidly welded thereto for preventing further rearward travel of the cradle 111 within the chassis 6. As the cradle 111 is permitted to roll rearwardly, on the rollers 110, the weight of the cradle 111 will force the same downwardly pivoting about the rollers 188. Further rearward travel will be prevented by abutting engagement of the link member 184 against the forwardly presented abutting surfaces 190. As the cradle 111 reaches its rearwardmost position, the upwardly extending projection 185' will lock with the outwardly extending bar 191, thereby locking automatically the cradle 111 in a fixed position. Forward movement is prevented until the lever arm 172 is urged rearwardly rocking the link member 184 and thereby lowering the upwardly extending projection 185' from abutting contact with the outwardly extending bar 191.

As the cradle 111 is rolled within the chassis 6, further forward movement will be prevented by means of L-shaped brackets 192 mounted on each of the rearwardly extending wheel-support members 131 that are aligned for abutting engagement with a stop-element 194 which is rigidly secured to the upper margin of the web member 10 on each of the lengthwise extending support members 2, 3, all as best seen in FIG. 13.

It should be obvious that by means of the above-outlined construction, the boat trailer A is capable of being rapidly assembled and disassembled. Most of the structure is rigidly connected by means of bolts or similar fastening means that are capable of providing strong shearing and bending support and yet capable of being easily and rapidly disengaged from their supporting position. For example, the various parts of the chassis 6, the tandem 64, and cradle 111 are respectively assembled by bolts. Moreover, the A-frame 11 is rigidly bolted to the forward end of the chassis 6. Consequently, the boat trailer A can be shipped in a disassembled condition and rapidly assembled at the retail outlet, thereby effecting substantial economy in shipping costs.

In use, one desiring to support a boat or other nautical vessel within the cradle 111 would adjust the position of the tandem 64 on the chassis 6, and the height of the chassis 6 on each of the wheels 96, 97, in accordance with the manner as described above. Similar adjustments would also be made on the rear wheels 139, 140, that are mounted on the cradle 111 for propeller-protection. These adjustments, of course, only have to be made once, for any particular boat to be carried on the boat trailer A.

When the brakes of a towing vehicle are applied, the forward movement momentum of the boat trailer A will cause the support member 15 to slide forwardly within the drawbar 27, thereby causing the piston 52 to be urged rearwardly within the cylinder 44 as in the manner described above. Thereupon, fluid will be pumped into the brakes of the trailer, locking the same. If, however, it is desired to reverse the direction of the towing vehicle, such vehicle is moved into reversed gear, thereby lighting the back-up or reverse lights and energizing the solenoid valve 61, thereby opening the same. As rearward movement of the towing vehicle urges the piston 52 rearwardly within the cylinder 44, brake fluid will be pumped into the reservoir 45 through the flexible tubing 60 rather than into the brakes *r* by means of the flexing hose 58. When the towing vehicle is shifted from a reverse gear to a forward gear, the solenoid valve 61 is then de-energized, permitting the brake system to function in the manner as described above.

In order to describe the operation of loading and unloading a boat from the boat trailer, it will be assumed that a boat B is loaded on the cradle 111 and which is, in turn, nested within the chassis 6, that is, the position as shown within FIG. 18. When it is desired to unload the boat B, the trailer A is backed into the water down an inclined surface, or boating dock, substantially as shown in FIG. 18. Each of the locking pins 163, which are manually operable so as to function as a so-called "safety," are removed from the locking position that is the position as shown in FIG. 12. The hook 25 of the cable 24 is, furthermore, removed from the flange member 125. The user of the boat B can then pull the lever arm 172 rearwardly, urging the link member 184 from the locking position as shown in FIG. 9, all as in the manner described above, thereupon permitting the cradle 111 to roll rearwardly within the chassis 6 on the rollers 110, to the position as shown in FIG. 19. The cradle 111 will then be permitted to tilt downwardly by its own weight about the rollers 188 and further rearward movement of the cradle 111 will be prevented by the abutting position of the link member 184 against the abutting surface 190.

When it is desired to load the boat B onto the trailer A, the boat B is driven to and onto the cradle 111 which is in the extended position and submerged in the water as shown in FIG. 19. Thereupon, the motor can be accelerated briefly and the thrust of the propeller, which is still in the water, will drive the boat B and cradle 111 as a unit up onto the chassis 6 and the forward inertia will carry them bodily out of the water. When the cradle 111 reaches transport position, it will lock automatically. If desired, the cable 24 can be attached to the flange member 125 through the central aperture 126, thereby cranking the cradle 111 into nesting position within the chassis 6 by means of the bell-crank arm 22. However, it is also convenient for the user of the boat B to idle the engine, permitting the boat B to move very slowly forwardly and urging the cradle 111 forwardly within the chassis 6. Forward movement, however, is prevented by means of the upwardly extending projection 185′ in abutting position with the pin 186. Thereupon, the user of the boat B will move the lever arm 172 rearwardly rocking the link member 184 and releasing the upwardly extending projection 185′ from abutting contact with the pin 191, thereby permitting the cradle 111 to roll forwardly within the chassis. When the cradle 111 has reached the position as shown in FIG. 18, further forward movement is prevented by means of the L-shaped brackets 192 abutting against the stop-element 194, as shown in FIG. 13. The cradle 111 is then locked within the chassis 6 by reinserting the pin 162 within the apertures 167, 168, and by the automatic locking position of the link member 184 with the pin 186. A further safety locking device is provided in the cable winch 21. By connecting the cable 24 to a conventional eye-bolt x mounted in the bow of the boat B, and locking the cable winch 21, the boat B and cradle 111 are prevented from sliding rearwardly within the chassis 6 during transit.

It also will be understood that the rear wheels 139, 140, serve the additional function of protecting the propeller in an inboard boat so that if the trailer should be driven over low ground or over a road having bumps or depressions so that the rear end of the boat and trailer tend to swing upwardly and downwardly, the wheels 139, 140, will strike any such obstruction and keep the propeller from receiving any impact. The wheels 139, 140, also perform substantially the same protective function when the boat is being loaded and unloaded. In addition to this, it should be noted that the downwardly extending trailer support 41 is rigidly secured to the U-shaped drawbar 27 and thereby will automatically cause the brakes r to function as a safety mechanism in the event that the trailer accidentally breaks loose from the vehicle during transit. In other words, if the trailer breaks loose, the front end will drop down toward the ground and the trailer support 41 will take the impact. The resulting rearward thrust will be transmitted to the drawbar 27, shifting it rearwardly and causing the brakes to be applied.

It should be understood that changes and modifications in the form, construction, arrangement, and combination of the several parts of the boat trailers may be made and substituted for those herein shown and described without departing from the nature and principle of our invention.

Having thus described our invention, what we claim and desire to secure by Letters Patent is:

1. The boat trailer comprising a frame having a forward and a rearward end, said frame including two lengthwise extending members and two transverse members rigidly connecting said lengthwise extending members at their ends, each of said lengthwise extending members comprising two parallel horizontal web portions connected by a vertical web at one longitudinal margin, and an upstanding flange member at the opposite longitudinal margin, boat-supporting means normally nested within said frame and having a forward and a rearward end, roller means mounted within said frame so that said boat-supporting means can be shifted from a position wherein it is nested within the frame to a position where it is rearwardly extended with respect to said frame and until the forward end of said boat-supporting means abuts the rearward end of said frame in said extended position, means for pivotally supporting the boat-supporting means about the rear end of said frame, first locking means for automatically locking said boat-supporting means in its nested position, release means for opening said first locking means and thereby permitting said boat-supporting means to shift within said frame to its extended position, and second locking means for automatically locking said boat-supporting means when it reaches the extended position.

2. A boat trailer comprising a frame, a boat-supporting cradle normally nested in said frame, first roller means mounted in said frame for shiftably supporting said cradle so that said cradle can be shifted from a position where it is nested within the frame to a position where it is rearwardly extended with respect to the frame, second roller means mounted within the end of said frame for permitting said cradle to be pivoted downwardly about said second roller means, first locking means for automatically locking said boat-supporting cradle in its nested position, release means for opening said first locking means and thereby permitting said boat-supporting cradle to shift within said frame, second locking means for automatically locking said boat-supporting cradle when it reaches its extended position, a wheel base mounted on said frame, means for sliding said wheel base longitudinally on said frame to any of a plurality of positions, means for locking said wheel base in any of said positions, wheels rotatably mounted on said wheel base, means for adjusting the vertical height of the wheels on said wheel base, a second set of wheels rotatably mounted on the rear end of said cradle, and means for vertically adjusting said second set of wheels, whereby said second set of wheels can support said cradle when in the extended position and protect the propeller of the boat from the pavement or high places when the carrying wheels are in low places.

3. The boat trailer of claim 2 wherein the frame consists of two lengthwise extending members and two transverse members rigidly connecting said lengthwise extending members at their ends, each of said lengthwise extending members comprising two parallel horizontal web portions connected by a vertical web at one longitudinal margin, an upstanding flange member at the opposite longitudinal margin, and the boat-supporting means consisting of two lengthwise extending members having a square-shaped cross-section connected by a plurality of transverse cross-connecting members.

4. The boat trailer of claim 2 wherein the frame consists of two lengthwise extending members and two transverse members rigidly connecting said lengthwise extending members at their ends, each of said lengthwise extending members comprising upper and lower parallel horizontal web portions connected by a vertical web at one longitudinal margin, an upstanding flange member at the opposite longitudinal margin, the boat-supporting means consisting of two lengthwise extending members having a square-shaped cross-section connected by a plurality of transverse cross-connecting members, and roller means mounted in and projecting upwardly from said upper horizontal web, said lengthwise extending boat-supporting members being adapted to ride on said rollers.

5. A boat trailer comprising a frame, a boat-supporting cradle normally nested in said frame, first roller means mounted in said frame for slidably supporting said cradle so that said cradle can be shifted from a position where it is nested within the frame to a position where it is rearwardly extended with respect to the frame, second roller means mounted within the end of said frame for permitting said cradle to be pivoted downwardly about said second roller means, a locking element rockably mounted on said cradle and having a pair of extended catch-forming elements, a first protruding member mounted on said frame in close proximity to the forward end thereof and being engageable by one of said pair of catch-forming elements for holding said cradle in its nested position, and a second protruding member mounted on said frame in close proximity to the rearward end thereof and being engageable by the other element of said pair of catch-forming elements for holding said cradle in its extended position.

6. A boat trailer comprising a frame, a boat-supporting cradle normally nested in said frame, first roller means mounted in said frame for slidably supporting said cradle so that said cradle can be shifted from a position where it is nested within the frame to a position where it is rearwardly extended with respect to the frame, second roller means mounted within the end of said frame for permitting said cradle to be pivoted downwardly about said second roller means, a locking element rockably mounted on said cradle and having a pair of extended catch-forming elements, a first protruding member mounted on said frame in close proximity to the forward end thereof and being engageable by one of said pair of catch-forming elements for holding said cradle in its nested position, a second protruding member mounted on said frame in close proximity to the rearward end thereof and being engageable by the other element of said pair of catch-forming elements for holding said cradle in its extended position, and release means operatively connected to said locking element for rocking said locking element and thereby shifting said catch-forming element out of engagement with either of said protruding members, thereby permitting said cradle to be shifted from its nested position to its extended position.

7. A boat trailer comprising a frame, a boat-supporting cradle normally nested in said frame, first roller means mounted in said frame for slidably supporting said cradle so that said cradle can be shifted from a position where it is nested within the frame to a position where it is rearwardly extended with respect to the frame, second roller means mounted within the end of said frame for permitting said cradle to be pivoted downwardly about said second roller means, a locking element rockably mounted on said cradle, said locking element having a downwardly extending finger and an upwardly extending finger, a first protruding member mounted on said frame in close proximity to the forward end thereof and being engageable by said downwardly extending finger for holding said cradle in its nested position, a second protruding member mounted on said frame in close proximity to the rearward end thereof and being engageable by said upwardly extending finger for holding said cradle in its extended position, and release means operatively connected to said locking element for rocking said locking element and thereby shifting said first and second fingers out of engagement with either of said protruding members, thereby permitting said cradle to be shifted from its nested position to its extended position.

8. A boat trailer comprising a frame, a boat-supporting cradle normally nested in said frame, first roller means mounted in said frame for slidably supporting said cradle so that said cradle can be shifted from a position where it is nested within the frame to a position where it is rearwardly extended with respect to the frame, second roller means mounted within the end of said frame for permitting said cradle to be pivoted downwardly about said second roller means, a locking element rockably mounted on said cradle, said locking element having a downwardly extending finger and an upwardly extending finger, a first protruding member mounted on said frame in close proximity to the forward end thereof and being engageable by said downwardly extending finger for holding said cradle in its nested position, a second protruding member mounted on said frame in close proximity to the rearward end thereof and being engageable by said upwardly extending finger for holding said cradle in its extended position, release means operatively connected to said locking element for rocking said locking element and thereby shifting said first and second fingers out of engagement with either of said protruding members, thereby permitting said cradle to be shifted from its nested position to its extended position.

9. A boat trailer comprising a frame, a boat-supporting cradle normally nested in said frame, first roller means mounted in said frame for slidably supporting said cradle so that said cradle can be shifted from a position where it is nested within the frame to a position where it is rearwardly extended with respect to the frame, second roller means mounted within the end frame for permitting said cradle to be pivoted downwardly about said second roller means, a locking element rockably mounted on said cradle locking element having a downwardly extending finger and an upwardly extending finger, a first protruding member mounted on said frame in close proximity to the forward end thereof and being engageable by said downwardly extending finger for holding said cradle in its nested position, a second protruding member mounted on said frame in close proximity to the rearward end thereof and being engageable by said upwardly extending finger for holding said cradle in its extended position, each of said fingers having an exterior camming surface for causing said locking element to rock when said fingers first come into contact with said protruding members, and release means operatively connected to said locking element for rocking said locking element and thereby shifting said first and second fingers out of engagement with either of said protruding members, thereby permitting said cradle to be shifted from its nested position to its extended position.

References Cited in the file of this patent

UNITED STATES PATENTS

| | | |
|---|---|---|
| 2,158,175 | Coppola et al. | May 16, 1939 |
| 2,320,585 | Gill et al. | June 1, 1943 |
| 2,405,810 | Berg et al. | Aug. 13, 1946 |
| 2,606,769 | De Lay | Aug. 12, 1952 |
| 2,700,480 | Triplett | Jan. 25, 1955 |
| 2,717,707 | Martin | Sept. 13, 1955 |
| 2,821,315 | Bucher | Jan. 28, 1958 |
| 2,827,188 | Reeder | Mar. 18, 1958 |
| 2,830,717 | Posey | Apr. 15, 1958 |
| 2,856,087 | Steber | Oct. 14, 1958 |
| 2,882,063 | Strasel | Apr. 14, 1959 |
| 3,011,670 | Chatterton et al. | Dec. 5, 1961 |